Patented June 30, 1931

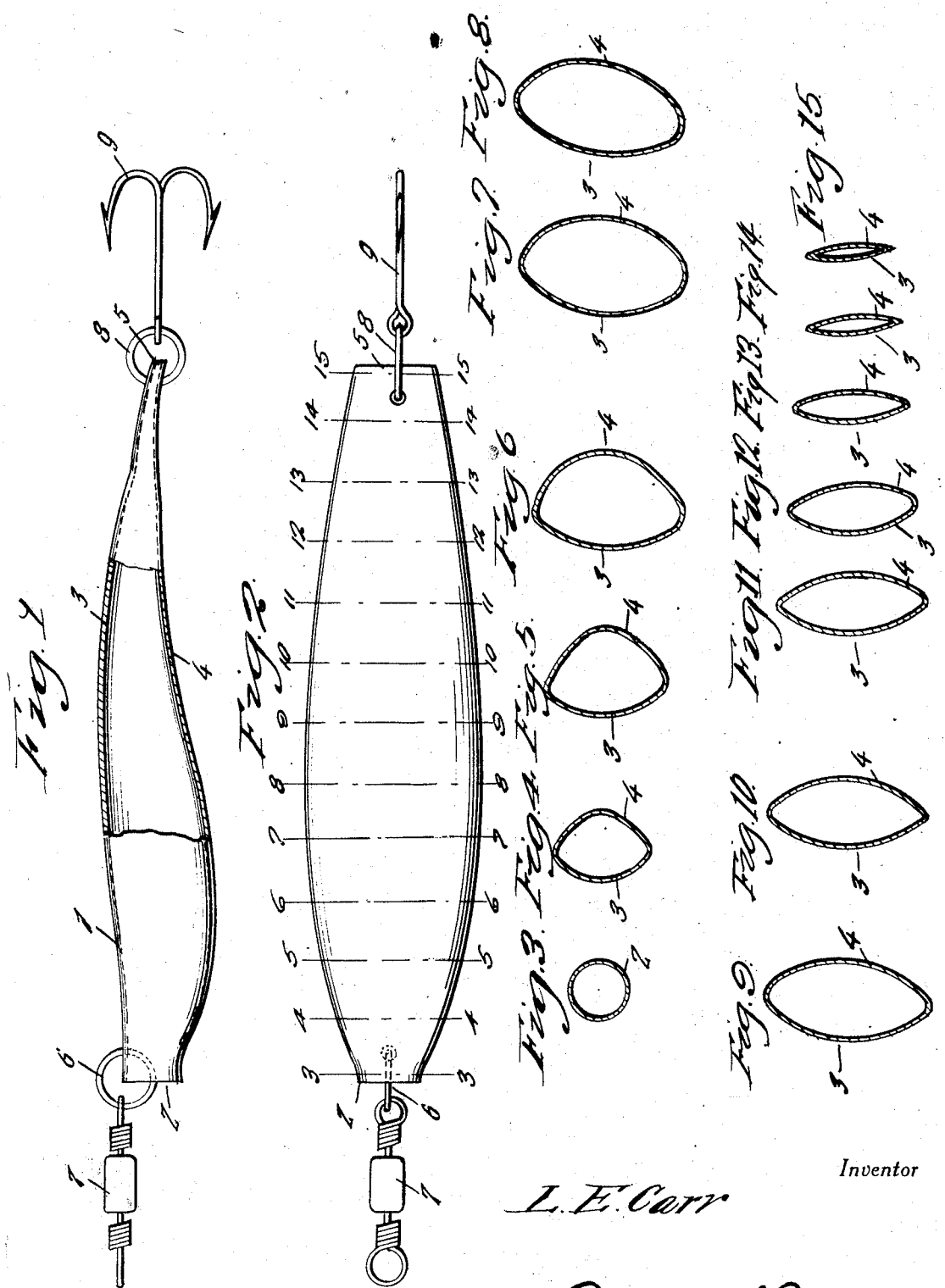

1,812,235

UNITED STATES PATENT OFFICE

LELAND ESTYN CARR, OF LOPEZ, WASHINGTON

ARTIFICIAL BAIT

Application filed October 24, 1929. Serial No. 402,124.

This invention relates to artificial bait and more particularly to devices of this character which are attached to a line and drawn through the water in simulation of a wounded minnow and wherein means are provided for securing bait therein for attracting the fish thereto.

An important object of the invention is to provide, in a manner as hereinafter set forth, an artificial bait of the aforementioned character which is formed substantially in the shape of a small fish or minnow having a brilliant outer surface for the purpose of attracting the fish and which is further adapted to contain bait which gives off an odor for further inducing the fish to bite or strike.

Another object of the invention resides in the provision of an artificial bait of the aforementioned character of a construction which permits the water to pass longitudinally therethrough and into contact with the bait therein for the purpose of distributing the odor of said bait in the wake of the artificial bait as it is drawn through the water and wherein the configuration of the same is such as to cause a zig-zag course to be described.

Other objects of the invention are to provide an artificial bait which will be simple in construction, strong, durable, efficient in its use and which may be manufactured at low cost.

Other objects and advantages of the invention will become apparent from a study of the following specification, taken in connection with the accompanying drawings, wherein like characters of reference designate corresponding parts throughout the several views, and, wherein:—

Figure 1 is a side elevation, partly broken away in section, of an artificial bait constructed in accordance with this invention.

Figure 2 is a top plan view thereof.

Figures 3 to 15, inclusive, are cross-sectional views taken substantially on the lines 3—3 to 15—15, inclusive, of Figure 2.

Referring to the drawings in detail, the reference character 1 designates the elongated hollow body of the artificial bait which is preferably constructed of a suitable metal having a lustrous outer surface for the purpose of attracting fish thereto.

The longitudinal sides of the body 1 are curved gradually outwardly from the neck portion 2 on the forward end thereof and then inwardly to the rear end of the body, as seen most clearly in Figure 2 of the drawings. The neck 2 is circular in cross-section, as seen in Figure 3, and is open at both ends. The upper wall 3 of the body 1 is convex in cross-section and extends rearwardly from the neck 2 in substantially parallel relation thereto and then curved upwardly and downwardly to the rear end of said body portion, as seen in Figure 1 and Figures 4 to 15 of the drawings. The bottom wall 4 of the body portion curves downwardly and upwardly and then rearwardly from the neck 2 to the rear end of said body portion and is of the cross-sectional configuration at different points throughout its length as illustrated in Figures 4 to 15 of the drawings. The oppositely curved opposed rear ends of the upper and lower walls 3 and 4 provide an opening 5 in the rear end of the artificial bait. A ring 6 is anchored to the upper wall 3 of the body portion adjacent the neck 2 for the purpose of securing a leader 7 to the artificial bait. A ring 8 extends through the rear portion of the upper and lower walls 3 and 4 for coupling a hook 9 thereto.

In the use of the invention, bait having the desired odor is inserted in the body portion 1 through the open neck 2 on the front end thereof and may be packed to an extent therein, it being usually desirable to force some of the bait outwardly through the opening 5 in the rear end thereof. The artificial bait is then drawn through the water and the configuration thereof causes the same to turn in simulation of a wounded fish or minnow as well as to revolve. This, together with the lustrous outer surface of the body portion, draws the attention of the fish thereto as it passes said fish and it being drawn through the water some of said water will pass thereinto through the neck 2 and contacts with the bait therein and be permeated with the odor thereof. The water will then pass outwardly through the opening 5 and the fish will be further attracted by the odor of the bait given off by this water. The fish will then trail behind the bait and strike from behind with the obvious result that it will be caught by the hook 9 in the usual manner.

By reason of the restricted opening 5, bait in a comparatively finely divided state may be packed into the body portion 1 and will be fed very slowly therefrom by the water passing therethrough until all of the bait is gone after which the device may be continued in use, the fish being attracted thereto by the simulation and resemblance thereof to a wounded minnow.

It is further pointed out that the darting movement of the bait is provided in part by securing the line 7 thereto in the upper wall thereof.

It is believed that the many advantages of an artificial bait constructed in accordance with this invention will be readily understood, and although the preferred embodiment of the invention is as illustrated and described, it is to be understood that changes in the details of construction may be had which will fall within the scope of the invention as claimed.

What is claimed as new is:—

1. An artificial bait of the character described comprising an elongated hollow body portion of substantially ovate cross section and an integral neck portion on one end of the body portion of circular cross section.

2. An artificial bait of the character described comprising an elongated, longitunally curved, hollow body portion of substantially ovate cross-section, and an integral neck portion on one end of the body portion of circular cross section.

3. An artificial bait of the character described comprising an elongated, longitudinally curved, hollow body portion of substantially ovate cross-section, an integral neck of circular cross section on one end of the body portion providing a fluid inlet opening, said body portion being further provided with a comparatively small fluid outlet opening at its other end.

4. An artificial bait of the character described comprising an elongated, longitudinally curved, hollow body portion of substantially ovate cross-section, an integral reduced inlet neck of circular cross section on one end of the body portion, means engaged with the neck for loosely connecting a line thereto, the body portion being further provided with a comparatively small fluid outlet opening in its other end, and means on said other end for loosely connecting a hook thereto.

In testimony whereof I affix my signature.

LELAND ESTYN CARR.